US012599989B2

(12) United States Patent
Nakamura

(10) Patent No.: US 12,599,989 B2
(45) Date of Patent: Apr. 14, 2026

(54) LASER PROCESSING METHOD THAT INCLUDES USE OF A SHEET THAT HAS TRANSMISSIBILITY

(71) Applicant: DISCO CORPORATION, Tokyo (JP)

(72) Inventor: Masaru Nakamura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 875 days.

(21) Appl. No.: 17/805,545

(22) Filed: Jun. 6, 2022

(65) Prior Publication Data

US 2022/0402076 A1     Dec. 22, 2022

(30) Foreign Application Priority Data

Jun. 21, 2021    (JP) ................................. 2021-102378

(51) Int. Cl.
B23K 26/53        (2014.01)
B23K 26/70        (2014.01)
(Continued)

(52) U.S. Cl.
CPC ............ B23K 26/53 (2015.10); B23K 26/702 (2015.10); B23K 37/0408 (2013.01); B23K 2101/40 (2018.08)

(58) Field of Classification Search
CPC .. B23K 2101/40; B23K 26/53; B23K 26/702; B23K 37/0408; B23K 26/70;
(Continued)

(56) References Cited

U.S. PATENT DOCUMENTS 8,753,923 B2 *   6/2014   Kobayashi ........ H01L 21/67092
                                                            438/464
2007/0035692 A1 *   2/2007   Shigematsu ........... B23K 26/40
                                                            349/187
(Continued)

FOREIGN PATENT DOCUMENTS

JP          10305420 A      11/1998
JP       2002192370 A      7/2002
(Continued)

OTHER PUBLICATIONS

Office Action issued in counterpart Japanese patent application No. 2021-102378, dated Apr. 22, 2025.
(Continued)

*Primary Examiner* — Edward F Landrum
*Assistant Examiner* — Adam M Eckardt
(74) *Attorney, Agent, or Firm* — GREER BURNS & CRAIN, LTD.

(57)            ABSTRACT
A processing method includes a holding step of holding a workpiece by a chuck table including a holding surface that holds the workpiece in an upper surface and a sheet covering step of covering the upper surface of the chuck table in addition to the workpiece by a sheet having transmissibility. The processing method also includes a close contact step of generating a suction force for the holding surface of the chuck table and reducing the pressure on a region covered by the sheet to bring the workpiece into close contact with the upper surface of the chuck table by an atmospheric pressure applied to the sheet and a modified layer forming step of positioning the focal point of a laser beam inside the workpiece through the sheet and irradiating the workpiece with the laser beam to form a modified layer.

6 Claims, 6 Drawing Sheets

(51) Int. Cl.
    *B23K 37/04*       (2006.01)
    *B23K 101/40*     (2006.01)

(58) Field of Classification Search
    CPC .... B23K 37/04; B23K 26/40; B23K 2103/50; B23K 26/364; B23K 2103/172; B23K 26/03; B23K 26/064; B23K 26/082; B23K 2103/52; B23K 2103/56; B23K 26/0006; B23K 26/0093; B23K 26/0624; B23K 26/0823; B23K 26/083; B23K 26/362; B23K 26/38; B23K 26/382; B23K 26/57; B23K 101/40; B23K 26/00; B23K 26/062; H01L 21/78; H01L 21/6836; H01L 2221/68327; H01L 21/3043; H01L 21/67092; H01L 21/67132; H01L 21/304; H01L 21/6838; H01L 2221/68336; H01L 2221/6834; H01L 21/02115; H01L 21/02126; H01L 21/02274; H01L 21/268; H01L 21/3221; H01L 21/447; H01L 21/52; H01L 21/67115; H01L 21/76894; H01L 2221/68381; H01L 2223/5446; H01L 23/544; H01L 21/683; H01L 21/02; H01L 21/301; H01L 21/302; H01L 21/44; H01L 21/46; H01L 21/48; H01L 21/50; H01L 21/67; H01L 21/687; B28D 5/0011; B28D 5/0005; B28D 5/0052; B28D 5/04; B28D 7/04; G04D 3/06; B23Q 3/088; B23Q 3/08; B24B 27/0076; B24B 41/061; B24B 41/067; B24B 57/02; B24B 7/07; B24B 7/228; B24B 27/00; B24B 41/06; B24B 7/04; B24B 7/22; C09J 2203/326; C09J 7/241; C09J 7/255; C09J 7/35; C09J 7/24; C30B 33/00; G02F 1/133351; G02F 1/133368; G02F 1/13; Y10S 125/901; Y10T 225/12; Y10T 349/187; Y10T 438/113; Y10T 438/114; Y10T 438/46; Y10T 438/462; Y10T 438/463
    See application file for complete search history.

(56)                References Cited

U.S. PATENT DOCUMENTS

| | | | |
|---|---|---|---|
| 2019/0164832 A1 | 5/2019 | Ueki | |
| 2019/0393089 A1* | 12/2019 | Zhao | C09J 7/241 |
| 2020/0269357 A1 | 8/2020 | Omori et al. | |
| 2020/0381303 A1 | 12/2020 | Hoshino et al. | |

FOREIGN PATENT DOCUMENTS

| | | | |
|---|---|---|---|
| JP | 2019192718 A | 10/2019 | |
| JP | 2020131259 A | 8/2020 | |
| JP | 2020198431 A | 12/2020 | |
| TW | 201926442 A1 | 7/2019 | |

OTHER PUBLICATIONS

Office Action issued in counterpart Taiwanese patent application No. 111122423, dated Oct. 7, 2025.

* cited by examiner

LASER PROCESSING METHOD THAT INCLUDES USE OF A SHEET THAT HAS TRANSMISSIBILITY

BACKGROUND OF THE INVENTION

Field of the Invention

The present invention relates to a processing method in which the focal point of a laser beam with such a wavelength as to be transmitted through a workpiece is positioned inside the workpiece and the workpiece is irradiated with the laser beam to form a modified layer inside the workpiece.

Description of the Related Art

A wafer on which a plurality of devices such as integrated circuits (ICs) and large-scale integration (LSI) circuits are formed on a front surface in such a manner as to be marked out by a plurality of planned dividing lines that intersect each other is divided into individual device chips by a laser processing apparatus, and the device chips obtained by the dividing are used for electrical appliances such as mobile phones and personal computers.

The laser processing apparatus includes a chuck table that holds the wafer, a laser irradiation unit that irradiates the wafer held by the chuck table with a laser beam with such a wavelength as to be absorbed by the wafer, and a processing feed mechanism that executes processing feed of the chuck table and the laser irradiation unit relatively. The laser processing apparatus can execute ablation processing to the planned dividing lines and divide the wafer into the individual device chips (for example, refer to Japanese Patent Laid-open No. Hei 10-305420).

Further, as a laser processing apparatus, there is an apparatus including a chuck table that holds a wafer, a laser irradiation unit that irradiates the wafer held by the chuck table with a laser beam with such a wavelength as to be transmitted through the wafer, and a processing feed mechanism that executes processing feed of the chuck table and the laser irradiation unit relatively. In this laser processing apparatus, internal processing in which the focal point of the laser beam is positioned inside the planned dividing line and the wafer is irradiated with the laser beam to form a modified layer inside the planned dividing line can be executed. Moreover, the wafer can be divided into the individual device chips by giving an external force to the wafer for which the internal processing has been executed (for example, refer to Japanese Patent No. 3408805).

SUMMARY OF THE INVENTION

However, when the internal processing is executed for the inside of the planned dividing line, volume expansion in association with the formation of the modified layer occurs and the wafer bends and the holding force of the chuck table for holding the wafer becomes unstable. In that case, there is a problem that it becomes impossible to properly continue the internal processing and to divide the wafer into the individual device chips.

Further, the present assignee has proposed a technique in which the focal point of a laser beam is positioned, inside a wafer or an ingot, to a depth corresponding to the thickness of a wafer to be generated and the wafer or the ingot is irradiated with the laser beam to form a modified layer and generate the wafer from the wafer or the ingot. However, particularly in the case of forming the modified layer inside the wafer, there is a problem that the wafer bends and it is impossible to properly form the modified layer.

Thus, an object of the present invention is to provide a processing method by which a modified layer can properly be formed inside a workpiece.

In accordance with an aspect of the present invention, there is provided a processing method in which the focal point of a laser beam with such a wavelength as to be transmitted through a workpiece is positioned inside the workpiece and the workpiece is irradiated with the laser beam to form a modified layer inside the workpiece. The processing method includes a holding step of holding the workpiece by a chuck table including a holding surface that holds the workpiece in an upper surface and a sheet covering step of covering the upper surface of the chuck table in addition to the workpiece by a sheet having transmissibility. The processing method includes also a close contact step of generating a suction force for the holding surface of the chuck table and reducing the pressure on a region covered by the sheet, to bring the workpiece into close contact with the upper surface of the chuck table by an atmospheric pressure applied to the sheet and a modified layer forming step of positioning the focal point of the laser beam inside the workpiece through the sheet and irradiating the workpiece with the laser beam to form the modified layer.

Preferably, the workpiece is a wafer on which a plurality of devices are formed on a front surface in such a manner as to be marked out by a plurality of planned dividing lines that intersect each other, and the modified layers are formed inside the planned dividing lines in the modified layer forming step. Preferably, the workpiece is an ingot, and the modified layers are formed in the whole region of the inside corresponding to the thickness of a wafer to be generated from the ingot, in the modified layer forming step.

According to the present invention, bending of the workpiece can be suppressed and the modified layer can properly be formed inside the workpiece.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
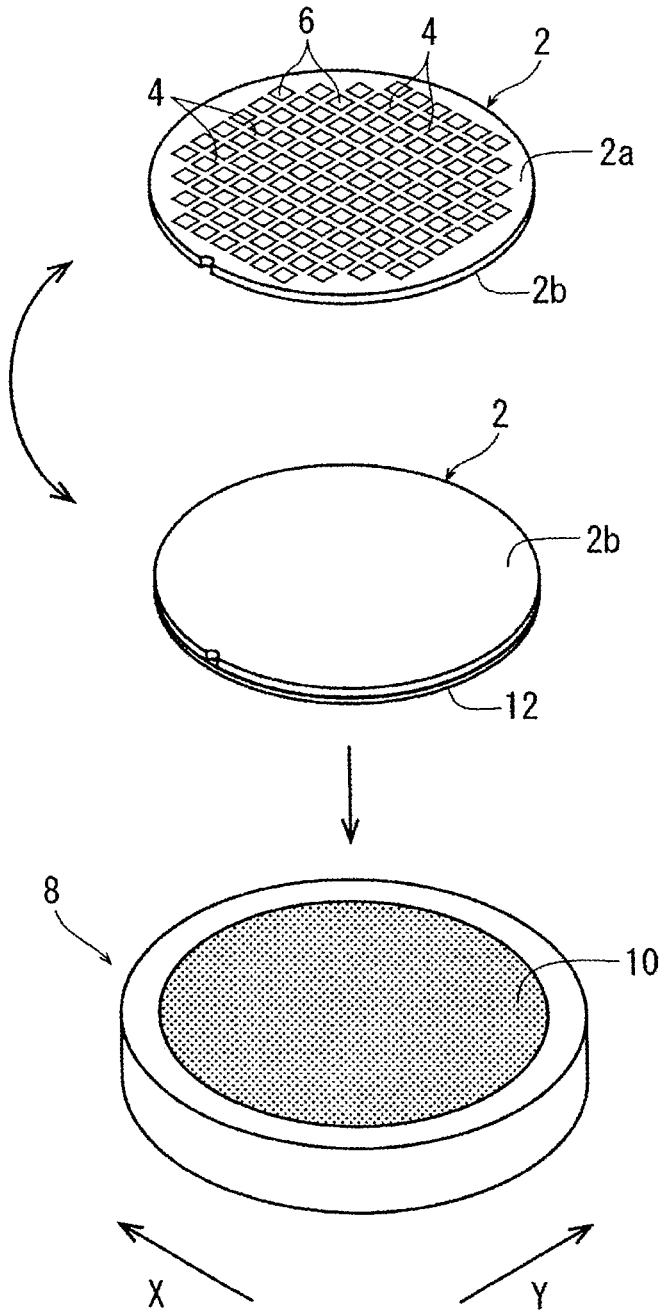
FIG. 1 is a perspective view illustrating the state in which a holding step is being executed.

A processing method according to a preferred embodiment of the present invention will be described below with reference to the drawings. In FIG. 1, a wafer 2 with a circular plate shape as a workpiece for which processing is executed by the processing method of the present invention is illustrated. The wafer 2 can be formed from an appropriate semiconductor material such as silicon (Si) or silicon carbide (SiC). The thickness of the wafer 2 is approximately 700 µm, for example. A front surface 2a of the wafer 2 is segmented into a plurality of rectangular regions by planned dividing lines 4 in a lattice manner, and a device 6 such as an IC or an LSI circuit is formed in each of the plurality of rectangular regions.

In the present embodiment, first, a holding step of holding a workpiece by a chuck table including a holding surface that holds the workpiece in an upper surface is executed. In the holding step, for example, a chuck table 8 illustrated in FIG. 1 can be used.

A porous circular suction adhesion chuck 10 connected to suction means (not illustrated) is disposed at the upper end part of the chuck table 8. The chuck table 8 holds under suction a workpiece placed on an upper surface of the suction adhesion chuck 10 by generating a suction force for the upper surface of the suction adhesion chuck 10 by the suction means. The upper surface of the suction adhesion chuck 10 serves as the holding surface as described above, and the chuck table 8 includes the holding surface that holds the workpiece in the upper surface. Further, the chuck table 8 is configured to be capable of moving in an X-axis direction and a Y-axis direction and rotating with an axis line that extends in an upward-downward direction being the rotation center.

The X-axis direction is a direction indicated by an arrow X in FIG. 1, and the Y-axis direction is a direction that is a direction indicated by an arrow Y in FIG. 1 and is orthogonal to the X-axis direction. Further, the XY-plane defined by the X-axis direction and the Y-axis direction is substantially horizontal.

In the holding step of the present embodiment, as illustrated in FIG. 1, first, a circular protective tape 12 for protecting the devices 6 is stuck to the front surface 2a of the wafer 2. Subsequently, the protective tape 12 is oriented downward, and the wafer 2 is placed on the holding surface of the chuck table 8 (upper surface of the suction adhesion chuck 10). In this manner, the chuck table 8 is caused to hold the wafer 2.

In the holding step, the holding surface of the chuck table 8 may be caused to hold the wafer 2 with a back surface 2b of the wafer 2 oriented downward. In this case, the protective tape 12 does not need to be stuck to the front surface 2a of the wafer 2.

After the holding step is executed, a sheet covering step of covering the upper surface of the chuck table 8 in addition to the workpiece by a sheet having transmissibility is executed.

Figure 2A:
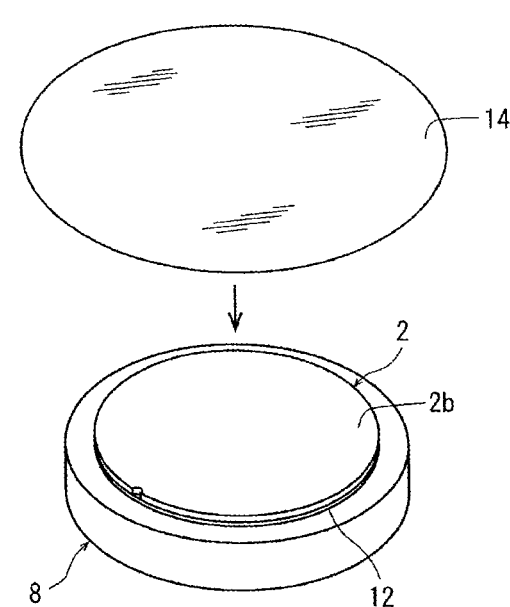
FIG. 2A is a perspective view illustrating the state in which a sheet covering step is being executed.

In the sheet covering step, for example, a transparent sheet 14 that is illustrated in FIG. 2A and is made of a synthetic resin can be used. The sheet 14 has a circular shape, and the diameter of the sheet 14 is larger than that of the wafer 2. It suffices that the material of the sheet 14 is what has transmissibility with respect to the laser beam with which irradiation is executed when a modified layer is formed inside the wafer 2. As the specific material of the sheet 14, polyolefin (polyethylene, polypropylene, polystyrene, or the like) is cited, for example. Further, a comparatively hard material (for example, polyethylene terephthalate, polyvinyl chloride, or the like) may be used as long as the sheet 14 is so thin as to be deformable along an upper surface of the wafer 2 and the upper surface of the chuck table 8 in a close contact step to be described later.

Moreover, in the sheet covering step, as illustrated in FIG. 2A, the sheet 14 is overlaid, from the upper side, on the chuck table 8 that holds the wafer 2, to cover the upper surface of the chuck table 8 as well as the wafer 2 by the sheet 14.

Figure 2B:
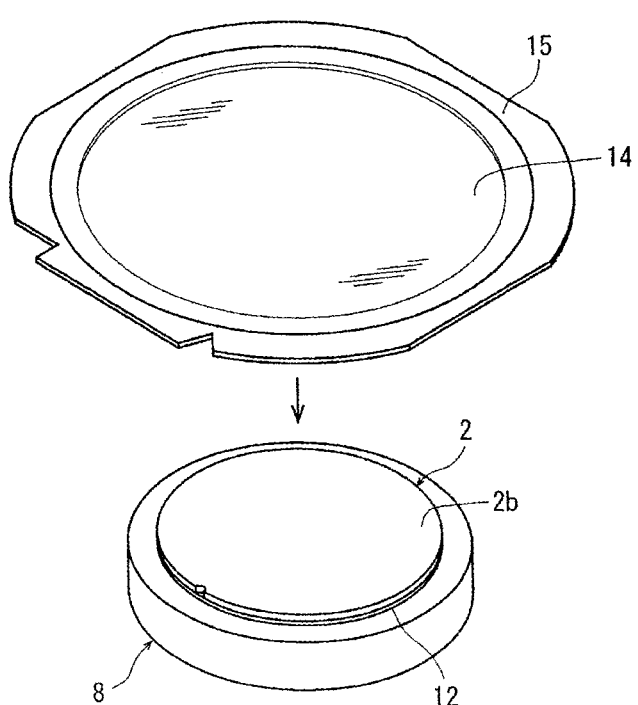
FIG. 2B is a perspective view illustrating the state in which the sheet covering step is being executed by using a sheet supported by an annular frame.

In the sheet covering step, as illustrated in FIG. 2B, the sheet 14 whose circumferential edge is supported by an annular frame 15 may be used. The annular frame 15 is fixed by a plurality of clamps (not illustrated) disposed around the chuck table 8. In terms of easiness of handling of the wafer 2 in subsequent steps, it is preferable that the sheet 14 be fixed to the annular frame 15.

After the sheet covering step is executed, the close contact step of generating a suction force for the holding surface of the chuck table 8 and reducing the pressure on the region covered by the sheet 14 to bring the workpiece into close contact with the upper surface of the chuck table 8 by the atmospheric pressure applied to the sheet 14 is executed.

In the close contact step, the suction force is generated for the upper surface of the suction adhesion chuck 10 as the holding surface of the chuck table 8 by actuating the suction means connected to the chuck table 8, and the wafer 2 is held under suction by the upper surface of the suction adhesion chuck 10. At this time, a gap, although slight, is formed between a lower surface of the wafer 2 and the upper surface of the suction adhesion chuck 10. Therefore, the suction force of the chuck table 8 acts on the sheet 14 overlaid on the wafer 2, through the slight gap between the lower surface of the wafer 2 and the upper surface of the suction adhesion chuck 10.

Figure 3A:
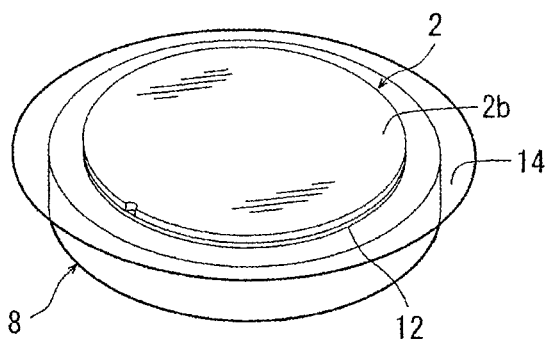
FIG. 3A is a perspective view illustrating the state in which a close contact step is being executed.
Figure 3B:
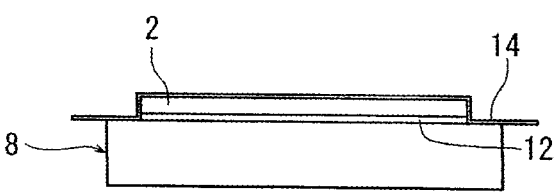
FIG. 3B is a side view illustrating the state in which the close contact step is being executed.

Therefore, when the suction force is generated for the upper surface of the suction adhesion chuck 10, the pressure on the region covered by the sheet 14 is reduced. Thus, due to the atmospheric pressure applied to an upper surface of the sheet 14, as illustrated in FIG. 3A and FIG. 3B, the wafer 2 is brought into close contact with the upper surface of the chuck table 8, and the sheet 14 is brought into close contact with the upper surface of the wafer 2 and the upper surface of the chuck table 8.

Further, even when warpage or undulation exists in the wafer 2 before the close contact step is executed, by executing the close contact step, the warpage or the undulation of the wafer 2 can be corrected, and the wafer 2 can be brought into close contact with the chuck table 8 along the upper surface of the chuck table 8.

In general, the diameter of the suction adhesion chuck 10 is slightly smaller than that of the wafer 2. However, by using a suction adhesion chuck having a diameter slightly larger than that of the wafer (for example, larger by approximately 2 to 3 mm), the suction force of the chuck table 8 may be caused to act on the sheet 14 from the outer circumference of the wafer 2.

After the close contact step is executed, a modified layer forming step of positioning the focal point of a laser beam inside the workpiece through the sheet 14 and irradiating the workpiece with the laser beam to form the modified layer is executed. The modified layer forming step can be executed by using a laser processing apparatus 16 partly illustrated in FIG. 4A and FIG. 4B, for example.

The laser processing apparatus 16 includes a laser oscillator (not illustrated), a light collector 18 that focuses a pulsed laser beam LB emitted from the laser oscillator and irradiates the workpiece held by the chuck table 8 with the pulsed laser beam LB, and imaging means (not illustrated) that images the workpiece held by the chuck table 8 and detects the region to be processed.

Although not illustrated, the imaging means of the laser processing apparatus 16 includes a normal imaging element (charge coupled device (CCD)) that images the workpiece by a visible beam, infrared ray irradiation means that irradiates the workpiece with an infrared ray, an optical system that captures the infrared ray with which irradiation is executed by the infrared ray irradiation means, and an imaging element (infrared CCD) that outputs an electric signal corresponding to the infrared ray captured by the optical system.

Figure 4A:
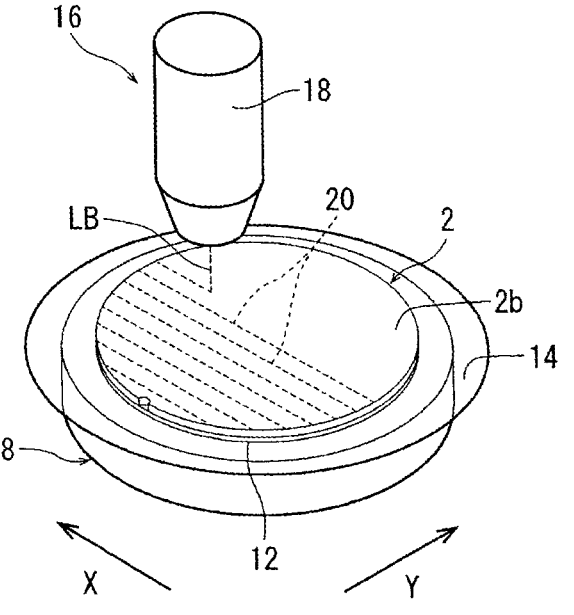
FIG. 4A is a perspective view illustrating the state in which a modified layer forming step is being executed.
Figure 4B:
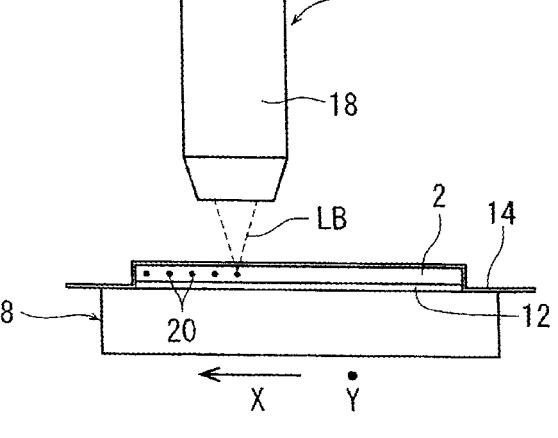
FIG. 4B is a side view illustrating the state in which the modified layer forming step is being executed.

The description will be continued with reference to FIG. 4A and FIG. 4B. In the modified layer forming step, first, the chuck table 8 with which the wafer 2 is in close contact is positioned under the light collector 18. Subsequently, the wafer 2 is imaged by the imaging means. Then, based on an image of the wafer 2 imaged by the imaging means, the planned dividing line 4 is aligned with the X-axis direction, and the light collector 18 is positioned above the planned dividing line 4 aligned with the X-axis direction. Next, the focal point of the laser beam LB is positioned to the inside of the wafer 2 located under the planned dividing line 4.

When the wafer 2 is imaged by the imaging means, the back surface 2b of the wafer 2 is oriented upward, and the front surface 2a in which the planned dividing lines 4 are formed is oriented downward. However, the imaging means can image the planned dividing line 4 in the front surface 2a through the back surface 2b of the wafer 2 because, as described above, the imaging means includes the infrared ray irradiation means, the optical system that captures the infrared ray, and the imaging element (infrared CCD) that outputs an electric signal corresponding to the infrared ray. This allows the focal point of the laser beam LB to be positioned to the inside of the wafer 2 located under the planned dividing line 4.

Subsequently, while the focal point of the laser beam LB and the wafer 2 are relatively moved by moving the chuck table 8 in the X-axis direction at a predetermined feed rate, the wafer 2 is irradiated with the laser beam LB with such a wavelength as to be transmitted through the wafer 2, the laser beam LB being emitted from the light collector 18. This can form a modified layer 20 inside the wafer 2 along the planned dividing line 4.

Next, indexing feed of the chuck table 8 is executed in the Y-axis direction by the interval of the planned dividing lines 4 in the Y-axis direction. Then, the modified layers 20 are formed inside the wafer 2 along all of the planned dividing lines 4 aligned with the X-axis direction, by alternately repeating the irradiation with the laser beam LB and the indexing feed. Subsequently, after the chuck table 8 is rotated by 90 degrees, the irradiation with the laser beam LB and the indexing feed are alternately repeated. The modified layers 20 are thereby formed inside the wafer 2 along all of the planned dividing lines 4 orthogonal to the planned dividing lines 4 along which the modified layers 20 have been formed previously.

Such a modified layer forming step as described above can be executed under the following condition, for example.

Wavelength of pulsed laser beam: 1064 nm

Average output power: 1.0 W

Repetition frequency: 100 kHz

Feed rate of chuck table: 100 mm/s

When the modified layer 20 is formed inside the wafer 2, volume expansion occurs at the modified layer 20. However, in the present embodiment, the wafer 2 does not bend because the wafer 2 is brought into close contact with the upper surface of the chuck table 8 by the atmospheric pressure applied to the upper surface of the sheet 14. Therefore, when the modified layer 20 is being formed, the holding force of the chuck table 8 for holding the wafer 2 does not become unstable and the modified layer 20 can properly be formed inside the wafer 2.

In the present embodiment, after the modified layer forming step is executed, a dividing step of dividing the wafer 2 into device chips of each individual device 6 is executed. The dividing step can be executed by using a grinding apparatus 22 illustrated in FIG. 5A, for example.

The grinding apparatus 22 includes a grinding unit 24 that grinds the wafer 2 held by the chuck table 8. The grinding unit 24 includes a spindle 26 that extends in the upward-downward direction and a wheel mount 28 that is fixed to the lower end of the spindle 26 and has a circular plate shape. An annular grinding wheel 32 is fixed to a lower surface of the wheel mount 28 by bolts 30. A plurality of grinding abrasive stones 34 annularly disposed at intervals in the circumferential direction are fixed to the outer circumferential edge part of a lower surface of the grinding wheel 32.

In the dividing step, first, the suction means connected to the chuck table 8 is stopped to deactivate the suction force of the suction adhesion chuck 10. Subsequently, the sheet 14 is removed from the chuck table 8. Next, the suction means is actuated again to hold the wafer 2 under suction by the chuck table 8. When the wafer 2 is held under suction, the back surface 2b of the wafer 2 is oriented upward as is understood through referring to FIG. 5A.

Figure 5A:
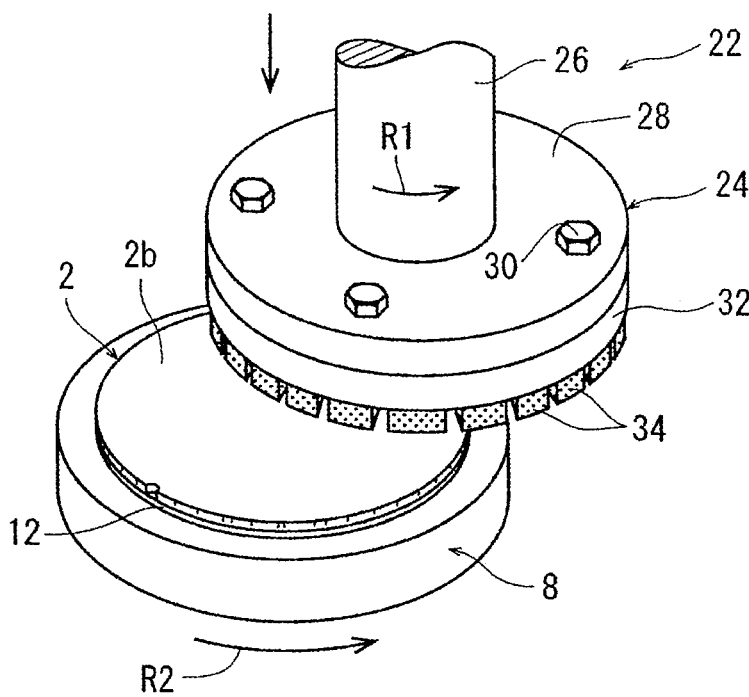
FIG. 5A is a perspective view illustrating the state in which a back surface of a wafer is being ground and the wafer is being divided into individual device chips.

Subsequently, the spindle 26 is rotated at a predetermined rotation speed (for example, 6000 rpm) in a direction indicated by an arrow R1 in FIG. 5A. Further, the chuck table 8 is rotated at a predetermined rotation speed (for example, 300 rpm) in a direction indicated by an arrow R2 in FIG. 5A. Next, the spindle 26 is lowered, and the grinding abrasive stones 34 are brought into contact with the back surface 2b of the wafer 2. Moreover, grinding water is supplied to the part at which the grinding abrasive stones 34 are brought into contact with the back surface 2b of the wafer 2. Thereafter, the back surface 2b of the wafer 2 is ground by lowering the spindle 26 at a predetermined grinding feed rate (for example, 1.0 μm/s).

Figure 5B:
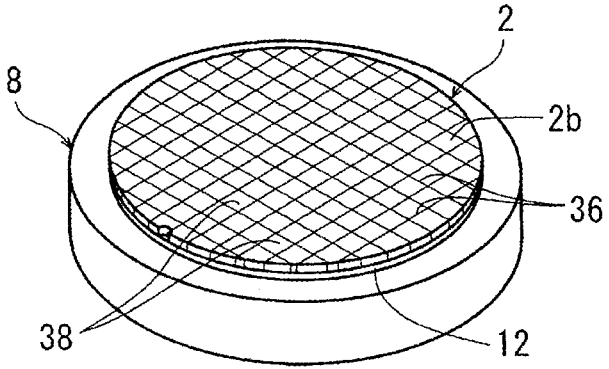
FIG. 5B is a perspective view illustrating the state in which the wafer has been divided into the individual device chips.

When the wafer 2 is being ground, a pressing force due to the grinding feed acts on the wafer 2, and cracks 36 (see FIG. 5B) thus extend in the thickness direction of the wafer 2 from the modified layers 20 toward the planned dividing lines 4. Therefore, the wafer 2 is divided into device chips 38 of each individual device 6 by the cracks 36 that extend from the modified layers 20.

Figure 6:
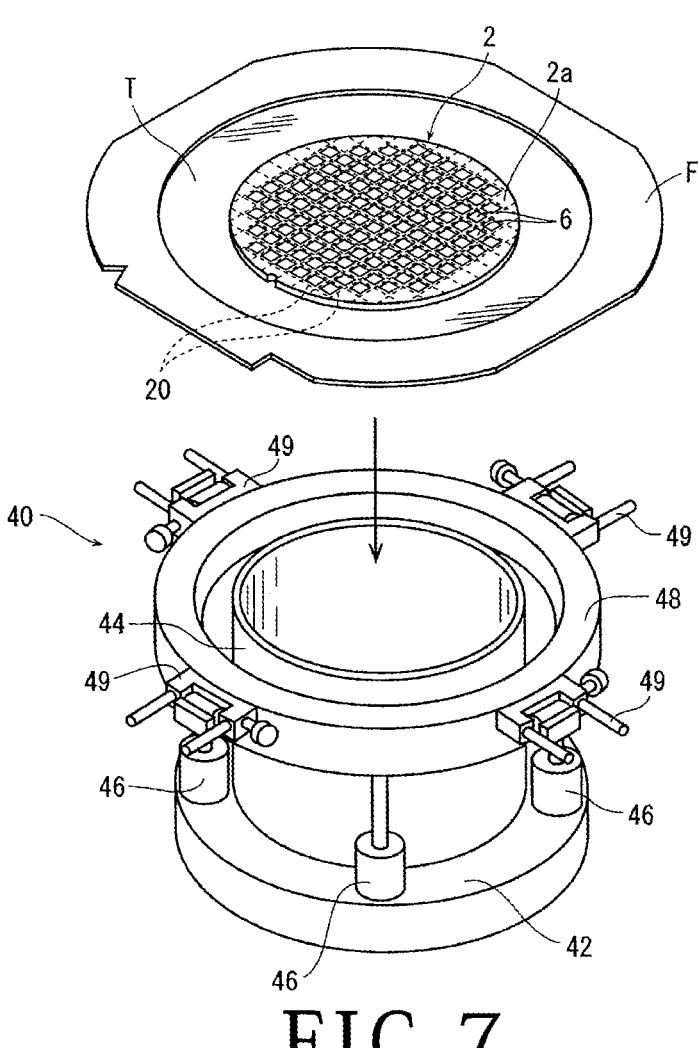
FIG. 6 is a perspective view of a dividing apparatus.

Further, the dividing step can be executed also by using a dividing apparatus 40 illustrated in FIG. 6. The dividing apparatus 40 includes a substrate 42 with a circular plate shape, a circular cylindrical expanding drum 44 that extends upward from an upper surface of the substrate 42, and a plurality of air cylinders 46 that extend upward from the circumferential edge part of the upper surface of the substrate 42 with the interposition of intervals in the circumferential direction. An annular holding member 48 is coupled to an upper end of each of the plurality of air cylinders 46. A plurality of clamps 49 are disposed at the outer circumferential edge of the holding member 48 at intervals in the circumferential direction.

Figure 7:
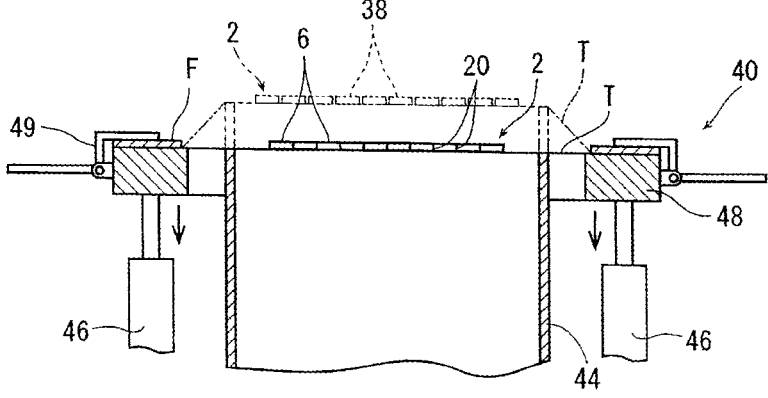
FIG. 7 is a schematic diagram illustrating the state in which the sheet is being expanded and the wafer is being divided into the individual device chips.

With reference to FIG. 7, each air cylinder 46 raises and lowers the holding member 48 between a reference position at which an upper surface of the holding member 48 is at almost the same height as an upper end of the expanding drum 44 and an expanding position at which the upper surface of the holding member 48 is located on the lower side relative to the upper end of the expanding drum 44. In FIG. 7, the expanding drum 44 when the holding member 48 is located at the reference position is illustrated by solid lines, and the expanding drum 44 when the holding member 48 is located at the expanding position is illustrated by two-dot chain lines.

When the dividing step is executed by using the dividing apparatus 40, as illustrated in FIG. 6, an adhesive tape T is stuck to the back surface 2b of the wafer 2, the outer circumference of the adhesive tape T is supported by an annular frame F, and the protective tape 12 is separated from the front surface 2a of the wafer 2. When, as illustrated in FIG. 2B, the circumferential edge of the sheet 14 is supported by the annular frame 15, a single surface of the sheet 14 has an adhesive surface, and the wafer 2 is stuck to the adhesive surface of the sheet 14, the sheet 14 and the annular frame 15 used in the sheet covering step can be used also in the dividing step.

The description will be continued with reference to FIG. 6 and FIG. 7. In the dividing step using the dividing apparatus 40, first, the annular frame F is placed on the upper surface of the holding member 48 located at the reference position, and the annular frame F is fixed by the plurality of clamps 49. Subsequently, the air cylinders 46 are actuated, and the holding member 48 is lowered to the expanding position. A radial tension thereby acts on the wafer 2 stuck to the adhesive tape T. Therefore, as illustrated by two-dot chain lines in FIG. 7, the wafer 2 can be divided into the individual device chips 38 along the planned dividing lines 4 along which the modified layers 20 are formed.

The configuration of the embodiment is as described above. In the processing method of the present embodiment, in the close contact step, the wafer 2 is brought into close contact with the upper surface of the chuck table 8 by the atmospheric pressure applied to the upper surface of the sheet 14. Thus, the wafer 2 does not bend even when volume expansion occurs at the modified layer 20. Therefore, when the modified layer 20 is being formed, the holding force of the chuck table 8 for holding the wafer 2 does not become unstable, and the modified layer 20 can properly be formed inside the wafer 2.

Figure 8A:
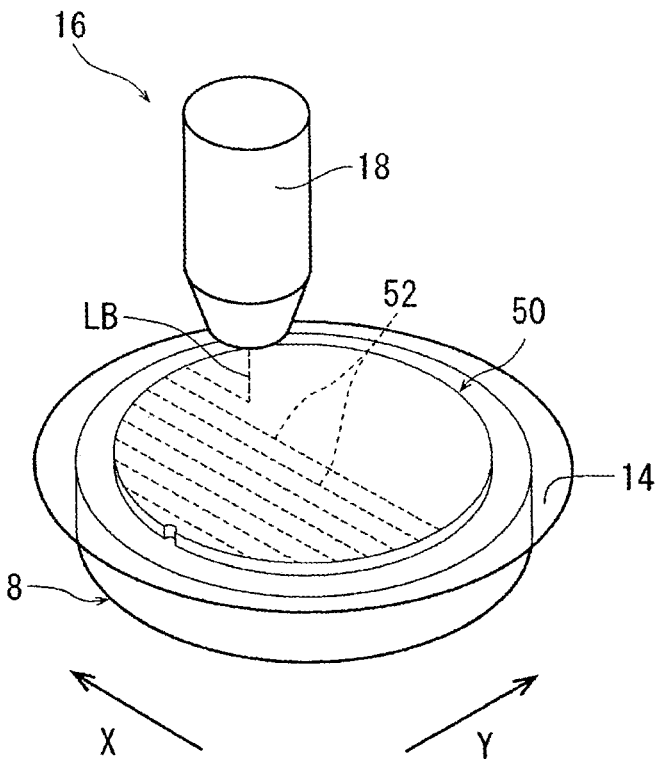
FIG. 8A is a perspective view illustrating the state in which the modified layer forming step is being executed for an ingot.

The workpiece that can be processed by the processing method of the present invention is not limited to the above-described wafer 2 and may be, for example, an ingot 50 like one illustrated in FIG. 8A. The ingot 50 can be formed from an appropriate semiconductor material such as Si or SiC. The thickness of the ingot 50 is approximately 700 to 2000 μm, for example. However, differently from the wafer 2, planned dividing lines and devices are not made on the ingot 50.

In the case of treating the ingot 50 as a workpiece, the holding step, the sheet covering step, and the close contact step are executed similarly to the case of treating the wafer 2 as a workpiece. Further, in the modified layer forming step for the ingot 50, modified layers are formed in the whole region of the inside corresponding to the thickness of the wafer to be generated from the ingot 50.

Specifically, first, the ingot 50 is imaged by the imaging means of the laser processing apparatus 16, and the positional relation between the ingot 50 and the light collector 18 is adjusted based on an image of the ingot 50 imaged by the imaging means. Subsequently, the focal point of the laser beam LB with such a wavelength as to be transmitted through the ingot 50 is positioned to a depth corresponding to the thickness of the wafer to be generated from the upper surface of the ingot 50.

Next, while the focal point of the laser beam LB and the ingot 50 are relatively moved by moving the chuck table 8 in the X-axis direction at a predetermined feed rate, the ingot 50 is irradiated with the laser beam LB with such a wavelength as to be transmitted through the ingot 50, the laser beam LB being emitted from the light collector 18. This can form a modified layer 52 inside the ingot 50 along the X-axis direction.

Subsequently, indexing feed of the chuck table 8 is executed in the Y-axis direction by a predetermined indexing feed amount. Because cracks (not illustrated) extend from the modified layer 52 in association with the formation of the modified layer 52, the indexing feed amount is set to such a distance that the cracks adjacent to each other in the Y-axis direction overlap with each other. Then, the modified layers 52 are formed in the whole region of the inside corresponding to the thickness of the wafer to be generated from the ingot 50, by alternately repeating the irradiation with the laser beam LB and the indexing feed in the Y-axis direction.

The modified layer forming step for the ingot 50 can be executed under the following condition, for example.

Wavelength of pulsed laser beam: 1342 nm
Average output power: 2.5 W
Repetition frequency: 60 kHz
Feed rate of chuck table: 300 mm/s
Indexing feed amount: 320 μm Also in the ingot 50, volume expansion occurs in association with the formation of the modified layer 52. However, because the ingot 50 is brought into close contact with the upper surface of the chuck table 8 by the atmospheric pressure applied to the upper surface of the sheet 14, bending of the ingot 50 can be suppressed and the modified layer 52 can properly be formed inside the ingot 50.

Figure 8B:
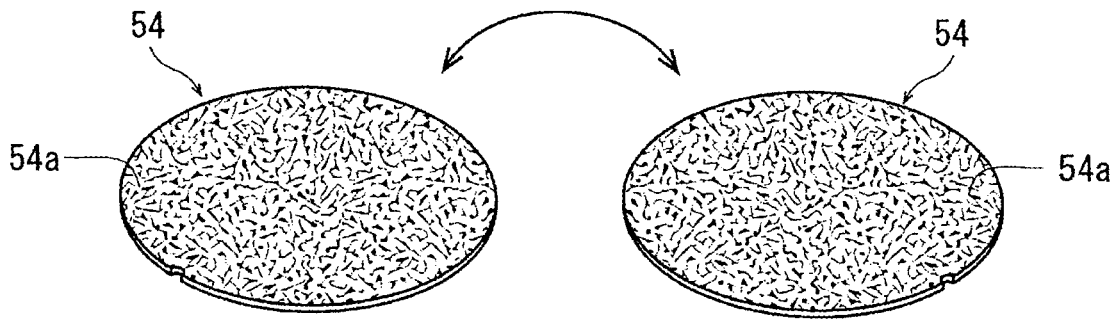
FIG. 8B is a perspective view of wafers generated from the ingot.

After the modified layers 52 are formed in the whole region of the inside corresponding to the thickness of the wafer to be generated from the ingot 50, an external force (for example, ultrasonic vibration) can be applied to the ingot 50, the ingot 50 can be divided by use of the modified layers 52 as the points of origin, and wafers 54 (in the present embodiment, two wafers 54) can be generated as illustrated in FIG. 8B. Depending on the thickness of the ingot 50, three or more wafers 54 may be formed through repetition of the modified layer forming step. Further, it is preferable to process dividing surfaces 54a of the generated wafers 54 into flat surfaces through grinding or polishing of the dividing surfaces 54a.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A processing method in which a focal point of a laser beam with such a wavelength as to be transmitted through a workpiece is positioned inside the workpiece and the workpiece is irradiated with the laser beam to form a modified layer inside the workpiece, the processing method comprising:

a holding step of holding the workpiece by a chuck table including a holding surface that holds the workpiece in an upper surface;

a sheet covering step of covering the upper surface of the chuck table in addition to the workpiece by a sheet having transmissibility, wherein the sheet is deformable;

a close contact step of generating a suction force for the holding surface of the chuck table and reducing a pressure on a region covered by the sheet, to bring the workpiece into close contact with the upper surface of the chuck table by an atmospheric pressure applied to the sheet; and a modified layer forming step of positioning the focal point of the laser beam inside the workpiece through the sheet and irradiating the workpiece with the laser beam to form the modified layer, and wherein during the close contact step, the sheet is deformed along the upper surface of the workpiece, an outer peripheral surface of the workpiece, and a portion of the upper surface of the chuck table.

2. The processing method according to claim 1, wherein the workpiece is a wafer on which a plurality of devices are formed on a front surface in such a manner as to be marked out by a plurality of planned dividing lines that intersect each other, and the modified layers are formed inside the wafer along the planned dividing lines in the modified layer forming step.

3. The processing method according to claim 1, wherein the workpiece is an ingot, and the modified layers are formed in a whole region of an inside of the ingot corresponding to a thickness of a wafer to be generated from the ingot, in the modified layer forming step.

4. The processing method according to claim 1, wherein the sheet is formed of a polyolefin.

5. The processing method according to claim 1, wherein the sheet is formed of polyethylene terephthalate.

6. The processing method according to claim 1, wherein the sheet is formed of polyvinyl chloride.

* * * * *